United States Patent [19]

Puurunen

[11] 4,060,183
[45] Nov. 29, 1977

[54] APPARATUS FOR PORTIONING OF A SOLID VEGETABLE RAW MATERIAL

[75] Inventor: Juhani Puurunen, Pietniemi, Finland

[73] Assignee: Oy W. Rosenlew AB, Pori, Finland

[21] Appl. No.: 695,757

[22] Filed: June 14, 1976

[30] Foreign Application Priority Data

June 17, 1975 Finland .................................. 751798

[51] Int. Cl.² ............................................. G01F 11/36
[52] U.S. Cl. ...................... 222/442; 222/447; 222/450
[58] Field of Search ...................... 222/442, 447, 450

[56] References Cited

U.S. PATENT DOCUMENTS

| | | | |
|---|---|---|---|
| 2,111,915 | 3/1938 | MacMillin | 222/447 |
| 2,723,057 | 11/1955 | Golden | 222/442 |
| 3,095,018 | 6/1963 | Moreland | 222/447 X |
| 3,190,509 | 6/1965 | Kirchhoefer | 222/450 |
| 3,303,974 | 2/1967 | Bleuler | 222/442 X |
| 3,347,741 | 10/1967 | Hutchison | 222/450 X |

Primary Examiner—Robert B. Reeves
Assistant Examiner—David A. Scherbel
Attorney, Agent, or Firm—Haseltine, Lake & Waters

[57] ABSTRACT

An apparatus for portioning of solid vegetable raw material from a storage space into a reactor under pressure. A sluice space closed by an upper and a lower slide type gate is provided between the storage space and the reactor for supplying the material into the reactor through the sluice space. Each gate comprises a chamber and a slide slideably provided therein for alternately opening and closing the connection between the storage space and the sluice space and the connection between the reactor and the sluice space respectively. The chamber of the slide chamber of the lower gate is connected at that end, which is positioned remote from the sluice space, by a pressure levelling channel to the storage space and the chamber of the slide chamber of the lower gate is at the corresponding end connected by a further pressure levelling channel to the sluice space. In this way the pressure levelling vapor escaping from the reactor to the sluice space flows through the entire lower slide chamber and the pressure levelling vapor escaping from the sluice space to the storage flows through the entire upper slide chamber in order to clean said chambers.

2 Claims, 1 Drawing Figure

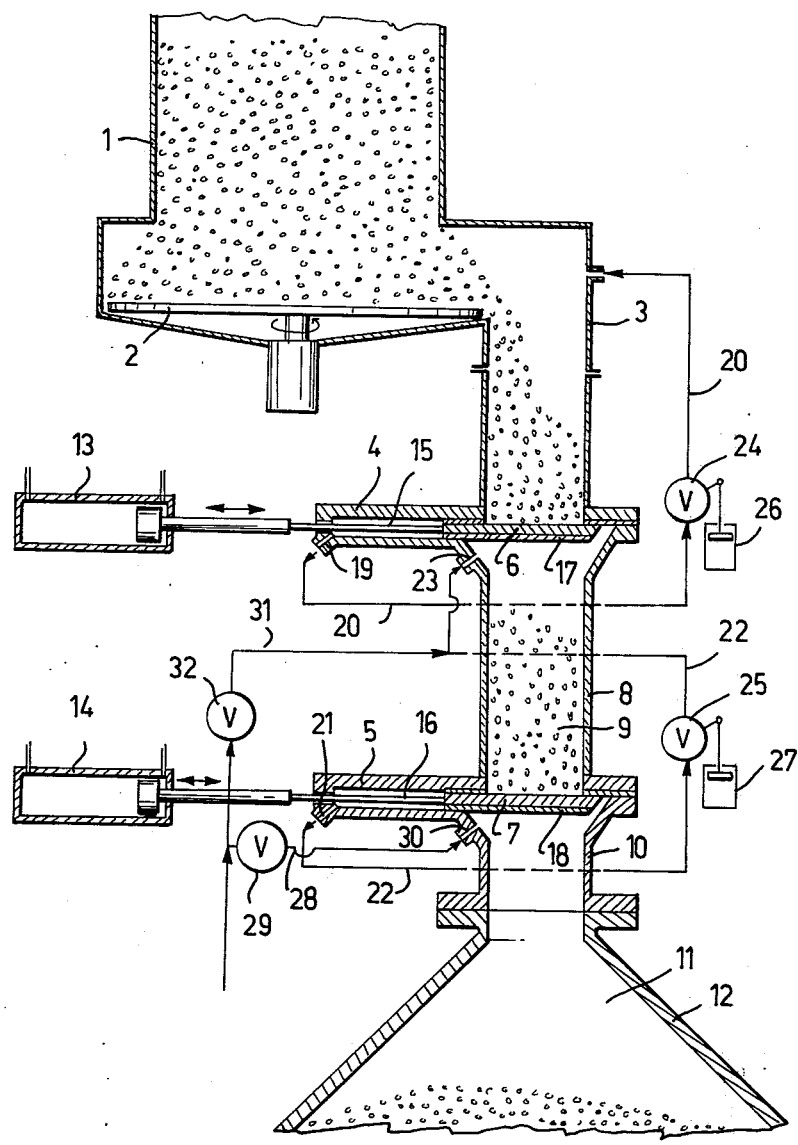

APPARATUS FOR PORTIONING OF A SOLID VEGETABLE RAW MATERIAL

The subject of the present invention is an apparatus for feeding solid vegetable raw material into a reactor under pressure through a sluice space limited by gate means, which apparatus comprises a storage space for the raw material to be fed, a vertical shoot leading from the storage space into the reactor under pressure, slide-type gate means that close the shoot and that limit said sluice space from both sides, actuating means for opening the gate means alternatingly in order to connect the sluice space alternately to the shoot and to the reactor under pressure, and pressure-levelling channels which pass from the sluice space to the shoot and to the reactor under pressure, respectively, so as to bring th sluice space alternately in pressure connection with the same.

It has been established that an apparatus of this type operates highly efficiently for the purpose of feeding a substantially dry and incompressible vegetable raw material into a space under a pressure higher than the pressure of the environment and usually also at a temperature higher than the room temperature. Owing to the variations in temperature and pressure to which the gate means become subject when the raw material is sluiced through them, it is difficult to have the plate slides move perfectly tightly in their slide chambers between the closing position and the opening position. This is why, in operation, small raw-material particles and raw-material dust can penetrate from the sluice space through the slide packings into the slide chambers, which can hamper or risk the satisfactory operation of the apparatus.

The purpose of the present invention is to provide an apparatus that permits periodic automatic cleaning of the gate means in connection with the normal closing of the apparatus when the sluice is alternately brought under pressure and under the pressure of the environment. This purpose is achieved by means of an apparatus that is characterized in that pressure-levelling channels start from the end of the slide chamber of each gate means positioned remote from the sluice space so that, before the gate means are opened, the pressure-levelling vapor escaping from the sluice space to the shoot and from the reactor to the sluice space respectively flows through the entire slide chambers.

In the apparatus in accordance with the invention, the periodic cleaning of the slide chambers of the gate means is achieved in connection with each pressure-levelling step of the sluice space, i.e. always when the sluice space is brought under the pressure of the treatment space and under the pressure of the environment, respectively. When the pressure-levelling vapor is passed through the slide chamber, the escaping vapor efficiently blows any foreign matter that has entered the slide chamber through the packing points of the plate slide, off the slide chamber so that the plate slide can be opened satisfactorily and that an optimum tightness in the closing position is reached.

The invention will be described more closely with reference to the attached drawing, which schematically shows an advantageous embodiment of the apparatus in accordance with the present invention as a vertical section.

The apparatus shown in the drawing comprises a storage space 1 for the raw material, on the bottom of which space a horizontal plate feeder 2 is mounted as rotatable and on one side of which space a vertical shoot 3 is arranged. The plate feeder can be of a type in itself known, but not a centrifugal feeder. In the channel, two gate means 4 and 5 are arranged, each of which comprises a plate slide 6 and 7, respectively, between which slides an intermediate space 9 consisting of a vertical channel 8 is formed. From the gate means, a shoot 10 passes downwards passing the pressure to a high-pressure reactor 11 subject to the corresponding temperature, which reactor may consist, for example, of a furfural reactor or a cellulose boiler 12.

The operating cylinders of the gate means 4 and 5 are denoted with 13 and 14, and the slide chambers of the plate slides 6 and 7 are denoted with 15 and 16.

Underneath the plate slides 6, 7, a slide surface 17 and 18, respectively, is fastened, which is preferably of polytetrafluora ethylene.

As comes out from the drawing, a pressure-levelling channel 20 leads from the end of the slide chamber 15 of the upper gate means 4 from fitting 19 to the shoot 3 and a pressure-levelling channel 22 from the end of the slide chamber 16 of the lower gate means 5 from fitting 21 to the sluice channel 8, and as expressed moe precisely, to fitting 23 placed in the upper part of the sluice channel. Valves 24, 25 which are controlled by the actuating devices 26, 27, are mounted in the pressure-levelling channels.

The raw material to be fed is portioned by means of the plate feeder 2 from the pressure-free storage space 1, which may be, for example, a pre-impregnating space, to the shoot 3 onto the plate slide 6 of the gate means 4, when said slide is in closing position. A closing valve 24 in the pressure-levelling channel 20 is opened under mechanical time control to level the pressure between the sluice space 9 and the pressure-free storage space 1, whereby the vapor at the same time blows the slide chamber 15 clean. The slide 6 of the gate means 4 is displaced by the actuating means 13 into the cleaned slide chamber 15 gliding on its slide surface 17 on the bottom face of the slide chamber and opens the shoot 3 to the sluice space 9, whereby the raw material drops unhindered into the sluice space 9 onto the plate slide 7. After the actuating means 13 has closed the plate slide 6, the pressure of the sluice space 9 an of the shoot 10 is levelled with the pressurized space 11 through a pressure-levelling channel 22 by means of an actuating means 27 controlling a valve 25 so that the plate slide 6 is pressed tightly against the packing surface and prevents leakage vapor from passing into the shoot 3. Immediately after each pressure-levelling step, the pressure-levelling channels 20, 22 are closed as controlled by their actuating means. The plate slide 7 of the gate means 5 is displaced by the actuating means 14 into the cleaned slide chamber 16 gliding on its slide surface 18 on the bottom face of the slide chamber 16 thus opening the sluice space 9 to the shoot 10, whereby the raw material drops unhindered into the space 11 under the same pressure.

After emptying of the sluice space 9, the plate slide 7 is closed by the actuating means 14. During the levelling of the pressure in the sluice space 9 through the channel 20, the plate slide 7 is pressed tightly against the packing surface thus preventing leakage vapor from passing into the sluice space 9, and the sluice space, with cleaned slide chamber 15, is ready to receive a new supply of raw material when the plate slide 6 of the gate means 4 is opened.

All aforementioned operations are time-controlled, whereby the quantity and rate of feed can be varied as desired by changing the time factors.

It is noticed that the pressure-levelling vapor escaping from the sluice space 9 and from the pressurized space 10 through the corresponding slide chamber 15 and 16 blows the sluice chamber clean before the gate means is opened, so that particles and dust that have come into the slide chambers do not prevent satisfactory opening and closing of the slides.

If required, the dropping of the raw material can be intensified by passing high-pressure vapor through the pipe 28, to which a control valve 29 is connected, into the top section of the dropping space 10 through the fitting 30, and through the pipe 31, to which a control valve 32 is connected, into the top section of the sluice space 9 through the fitting 23.

The drawing and the related description are only intended to illustrate the idea of the invention. In its details, the apparatus in accordance with the invention my display even considerable variation within the scope of the claims.

What I claim is:

1. An apparatus for feeding a solid vegetable raw material into a reactor under pressure through a vertical sluice channel limited by gate means, which apparatus comprises a storage space for the raw material to be fed, a vertical shoot leading from the storage space into the reactor under pressure, at least two slide-type gate means that close the shoot and that define in said sluice channel a sluice space between said gate, actuating means having slide chambers for opening said gate means alternatingly in order to connect said sluice space alternately to the vertical shoot above the gate means and to said reactor, and pressure-levelling channels which pass from the sluice space to said vertical shoot above said gate means and to the reactor under pressure, respectively, so as to bring the sluice space alternately in pressure connection with same, wherein the respective pressure-levelling channels are connected to the slide chamber means of said gate means, but positioned remote from the sluice space so that, before the gate means are opened, the pressure-levelling vapor escaping from the sluice space to the shoot and from the reactor to the sluice space respectively are connected via said slide chambers.

2. An apparatus as claimed in claim 1, wherein gliding units or slide surfaces of a plastics material having suitable friction properties and heat resistance are fastened underneath the plate slides of the gate means.

* * * * *